United States Patent [19]

Oishi et al.

[11] 4,432,211

[45] Feb. 21, 1984

[54] DEFROSTING APPARATUS

[75] Inventors: Tetsu Oishi; Makoto Oda, both of Yokohama; Hisao Futaki, Musashino, all of Japan

[73] Assignee: Hitachi, Ltd., Tokyo, Japan

[21] Appl. No.: 319,313

[22] Filed: Nov. 9, 1981

[30] Foreign Application Priority Data

| Nov. 17, 1980 [JP] | Japan | 55-160788 |
| Mar. 20, 1981 [JP] | Japan | 56-39437 |
| Mar. 20, 1981 [JP] | Japan | 56-39438 |
| Mar. 20, 1981 [JP] | Japan | 56-39439 |
| Mar. 20, 1981 [JP] | Japan | 56-39440 |
| Mar. 20, 1981 [JP] | Japan | 56-39442 |

[51] Int. Cl.³ .................................... F25D 21/06
[52] U.S. Cl. .................................... 62/155; 62/156; 62/234; 219/497; 338/22 R
[58] Field of Search ............... 62/156, 151, 155, 234; 338/22 R; 219/497, 499

[56] References Cited

U.S. PATENT DOCUMENTS

| 3,793,716 | 2/1974 | Smith-Johannsen | 29/611 |
| 4,162,379 | 7/1979 | Sebens et al. | 219/497 |
| 4,177,376 | 12/1979 | Horsma et al. | 219/553 |
| 4,277,673 | 7/1981 | Kelly | 219/528 |
| 4,334,148 | 6/1982 | Kampe | 338/22 R X |

FOREIGN PATENT DOCUMENTS

| 54-24344 | 2/1979 | Japan | 62/156 |
| 54-101533 | 8/1979 | Japan | 62/151 |

Primary Examiner—Albert J. Makay
Assistant Examiner—Harry Tanner
Attorney, Agent, or Firm—Antonelli, Terry & Wands

[57] ABSTRACT

A defrosting apparatus for removing frost deposited on a cooler of a refrigerator or an air conditioner employs a defrosting heater exhibiting a positive temperature coefficient of resistance which changes sharply at a specific temperature. A specific rate of change of the heater current of the defrosting heater is detected, and on the basis of the detected current change rate, stopping or starting of current supply to the defrosting heater is controlled. The defrosting heater is an organic type heater or an inorganic ceramic type heater possessing the function of self-temperature control.

21 Claims, 17 Drawing Figures

DEFROSTING APPARATUS

BACKGROUND OF THE INVENTION

This invention relates to a defrosting apparatus for removing frost deposited on a cooler of a refrigerator, an air conditioner or the like.

Deposition of frost on a cooler of a refrigerator or an air conditioner results in an undesirable reduction of the heat exchange efficiency of the cooler hence, in a reduced cooling ability. Therefore, in a refrigerator, for example, a defrosting heater is provided, and, while stopping the operation of the refrigerator after the refrigerating operation of the refrigerator over a predetermined period of time, current is supplied to the defrosting heater so as to remove frost by melting by the heat produced by the defrosting heater thereby preventing the undesirable reduction of the refrigerating ability. As a prior art example of the defrosting heater commonly used in the refrigerator, there is a heater structure in which a metal wire such as a nichrome wire or a nickel-copper wire is inserted in a protective tube of material such as aluminum.

The prior art defrosting heater does not possess the function of self-temperature control and is such that it generates and maintains a constant quantity of heat regardless of the amount of frost deposited on the cooler and regardless of the distribution of frost. Thus, complete removal of frost from various portions of the evaporator is not attained at the same time. In other words, complete removal of frost from the cooler portion having a largest amount of frost deposited thereon is delayed relative to the remaining portions. In order to detect complete removal of frost from all the portions of the cooler, therefore, a temperature sensor such as a thermistor has been mounted on the cooler portion where complete removal of frost is attained latest, and the defrosting process has been regarded to be completed when the temperature sensor continuously sensing the temperature at that portion senses a predetermined temperature in the course of defrosting by the defrosting heater. Further, taking into consideration the variation in the amount of deposited frost varying depending on the season of a year and also the variation in the distribution of deposited frost varying depending on the disposition of stuffs such as foodstuffs stored in the refrigerator, the defrosting cnditions including the defrosting temperature and duration had to be suitably determined to ensure sufficient removal of frost in each of the above cases. Consequently, the temperature of a cooler portion, where the amount of deposited frost is relatively small and removal of frost is completed earlier than another portion, becomes unnecessarily high, and the current is supplied for an unnecessarily long period of time. This means that large temperature differences occur between various portions of the cooler at the time of termination of current supply to the defrosting heater. The prior art defrosting system, according to which a portion of the evaporator is heated up to an unnecessarily high temperature, has therefore been defective in that a long period of time is required for reducing the temperature of the cooler before the operation of the refrigerator is re-started after the complete removal of frost, and that a large quantity of power is inevitably consumed. The prior art defrosting system has also been defective in that an unnecessarily large quantity of power has been required for generating heat from the defrosting heater. The prior art defrosting system has further been defective in that the temperature of stuffs such as foodstuffs stored in the refrigerator tends to be raised.

As a means for obviating the prior art defects pointed out above, Japanese Patent Application Laid-open No. 101533/79 laid open to the public on Aug. 10, 1979 (Application No. 7281/78 filed on Jan. 27, 1978) discloses a defrosting control apparatus in which a positive-characteristic thermistor exhibiting a positive temperature coefficient of resistance is used in place of the prior art defrosting heater or is incorporated in a portion of the prior art defrosting heater, and the current flowing through the defrosting heater is interrupted when the heater current decreases to a predetermined constant level. However, the resistance value of the heater disposed in close proximity to the cooler changes inevitably after a long period of time of use, because the heater is repeatedly subjected to a severe cooling and heating cycle involving frost, ice, water and heating conditions. Consequently, when the resistance value of the heater increases after a long period of time of use, the heater in the disclosed defrosting control apparatus will cease to generate heat under a condition in which frost is incompletely removed. On the other hand, when the resistance value of the heater decreases after the long period of time of use, the heater will still continue to generate heat even after the frost has been completely removed. Thus, in the disclosed defrosting control apparatus too, the threshold level controlling the cut-off timing of the heater current must be so selected as to give a margin which leads to a slight extension of the defrosting duration. Therefore, the disclosed defrosting control apparatus has had defects similar to those of the firstmentioned defrosting system in which the metal wire inserted in the protective tube is used to operate as the defrosting heater.

Another problem is how to determine the starting timing of defrosting operation in order to prevent an undesirable reduction of the refrigerating ability of the cooler. It is very difficult to accurately detect the defrosting operation starting timing since the factors including the amount of deposited frost and the distribution of deposited frost, which reduce the refrigerating ability, vary depending on the season, operating condition of the cooler etc. Thus, it has been a common practice to remove frost after a predetermined period of time of operation of the refrigerator, and this period of time has been determined by considering that the refrigerating ability of the evaporator may not be lowered even in the season in which frost tends to be deposited in a large amount.

However, a defrosting control apparatus including such means has been defective in that it carries out defrosting operation at relatively short time intervals even in the season in which the amount of deposited frost is small in spite of the fact that the refrigerating ability of the evaporator is not lowered at all in such a season, resulting in a wasteful consumption of power. The prior art defrosting control apparatus has also been defective in that the temperature of the evaporator is unnecessarily raised by the power required for the frost removal, and an extended period of time is required until the temperature of the cooler is lowered prior to re-starting the refrigerating operation. Further, a large quantity of power has been inevitably consumed.

SUMMARY OF THE INVENTION

It is a primary object of the present invention to provide a novel and improved defrosting apparatus which can remove frost with high efficiency.

The defrosting apparatus according to the present invention is featured by the fact that it employs a heater which possesses the function of self-temperature control, which includes a heating element in the form of a mixture of a conductive material such as carbon and an organic material such as high-density polyethylene, and whose operating temperature lies within the range of 30° C. to 110° C. In another aspect of the present invention, it employs a ceramic heater which exhibits a positive temperature coefficient of resistance and in which the temperature coefficient of resistance changes sharply at a specific temperature. In the latter aspect of the present invention, such a heater is used as the defrosting heater, and the sharp change of its temperature coefficient of resistance is utilized to detect complete removal of frost thereby completing the defrosting operation.

Another object of the present invention is to provide a defrosting apparatus in which, the fact that the operating characteristic of the defrosting heater during the defrosting operation changes depending on the amount of frost deposited on the cooler is utilized to judge as to whether or not the defrosting operation is required.

DESCRIPTION OF THE PREFERRED EMBODIMENTS

Figure 1:
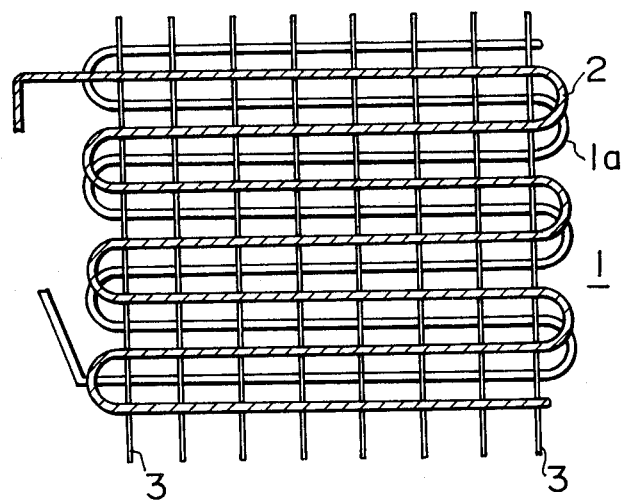
FIG. 1 shows the structure of an evaporator in a refrigerator.

Referring to FIG. 1 showing the structure of a cooler in a refrigerator, reference numerals 1, 1a, 2 and 3 designate the cooler, a refrigerant conduit, a defrosting heater, and heat exchanging fins, respectively.

Figure 2:
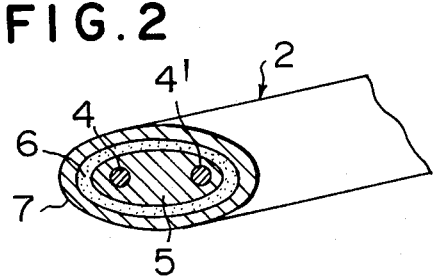
FIG. 2 is a partly sectional, perspective view of the defrosting heater employed in the defrosting apparatus according to the present invention.

Referring to FIG. 2 showing the structure of a heater employed in the present invention and possessing the function of self-temperature control, reference numerals 4 and 4' designate current-supplying electrical conductors, for example, tinned copper wires. The electrical conductors 4 and 4' are enclosed in a heater element 5 which is composed of a mixture of an organic material, for example, high-density polyethylene, and an electrical conductive material, for example, carbon and possesses the function of self-temperature control. The heater element 5 is covered with a layer 6 of electrical insulator, for example, urethane rubber, and the insulator layer 6 is covered with a layer 7 of noncombustible material, for example, polyethylene.

Figure 3:
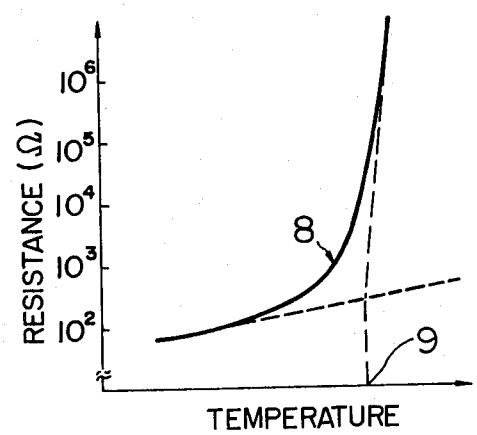
FIG. 3 is a graph showing the temperature vs. resistance characteristic of the defrosting heater shown in FIG. 2.

The operation of the heater 2 will now be described. When a rated voltage is applied across the electrical conductors 4 and 4', current flows from, for example, the electrical conductor 4 to the electrical conductor 4' through the heater element 5 which is in the form of the mixture of the organic material and carbon and which possesses the function of self-temperature control. The heater element 5 generates heat according to the Joule's law. With the temperature rise due to the Joule heat, thermal expansion of the organic material occurs resulting in an increase of the specific resistance of the heater element 5. As the temperature approaches the softening point determined by that of the organic material employed, the resistance value of the heater element 5 increases sharply. FIG. 3 shows the change in the resistance value of the heater element 5. In FIG. 3, the vertical axis represents the resistance value of the heater element 5, and the horizontal axis represents the temperature. The curve 8 in FIG. 3 indicates the resistance change characteristic of the heater element 5, and the point 9 indicates the setting of the operating temperature. With the temperature rise of the heater element 5, its specific resistance value increases sharply as shown, and the current value decreases correspondingly. The temperature ceases to rise when it attains a constant level determined by the organic material employed, and the temperature is then stabilized at that level.

Figure 4:
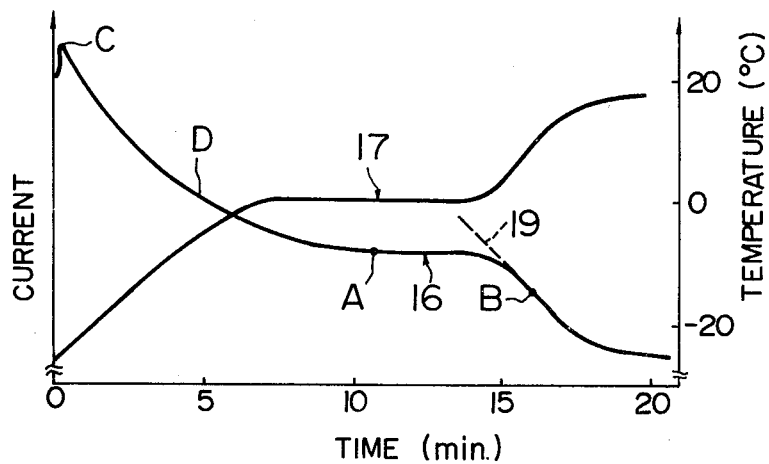
FIG. 4 is a graph showing how the temperature of the evaporator and the heater current flowing through the defrosting heater employed in the defrosting apparatus of the present invention vary with time.

Description will now be directed to the manner of detection of completion of frost removal by the use of the defrosting heater 2 possessing the function of self-temperature control. FIG. 4 shows the relation between the time-related change of the value of current flowing through the defrosting heater 2 possessing the function of self-temperature control and the time-related change of the temperature of the cooler 1. In FIG. 4, the horizontal axis represents the time elapsed after the supply of current to the defrosting heater 2 is started, and the vertical axis represents the value of current flowing through the defrosting heater 2 and represents also the temperature of the evaporator 1. The curve 16 in FIG. 4 indicates the heater current, and the curve 17 indicates the evaporator temperature. Immediately after the defrosting heater 2 is energized, inrush current flows to sharply raise the temperature of the defrosting heater 2. With the temperature rise of the defrosting heater 2, the heater current 16 starts to decrease, and the temperature at various portions of the cooler 1 is raised to start melting of frost. In the course of frost removal from the various portions of the cooler 1, the rate of decrease of the heater current 16 decreases due to the heat absorbed for the melting of frost until it is stabilized at a point A at which the current value is maintained substantially constant. Upon completion of frost removal, the temperature of the heater element 5 starts to rise again to increase the specific resistance of the heater element 5, and the heater current 16 starts to decrease again. In FIG. 4, the point B indicates the time of completion of frost removal, and the dotted line 19 indicates the gradient of decrease of the heater current 16 at the time of completion of frost removal. Although the duration of current supply to the defrosting heater 2 varies depending on the amount of deposited frost, the gradient of decrease of the heater current 16 at the time of completion of frost removal is constant. This phenomenon is utilized for the detection of completion of frost removal in the defrosting apparatus according to the present invention.

Figure 5:
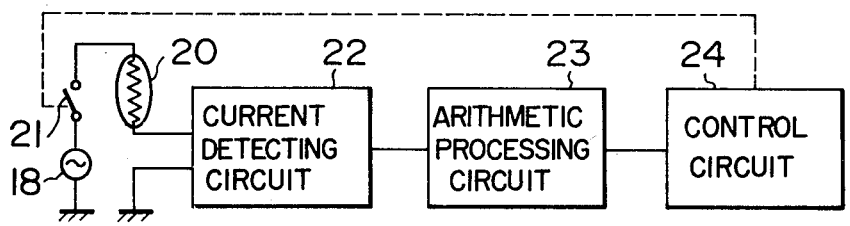
FIG. 5 is a block diagram of an embodiment of the defrosting apparatus according to the present invention.

FIG. 5 is a block diagram of a first embodiment of the defrosting apparatus according to the present invention. Referring to FIG. 5, a power source 18 is connected to a defrosting heater 20 through a switch 21 supplying current to the defrosting heater 20. A current detecting circuit 22 detects the current flowing through the defrosting heater 20, and an arithmetic processing circuit 23 connected to the current detecting circuit 22 is programmed for the arithmetic processing of the output signal from the current detecting circuit 22. A control circuit 24 turns off the current-supply switch 21 in response to the output signal from the arithmetic processing circuit 23.

When the current-supply switch 21 in the defrosting apparatus is turned on, current is supplied from the power source 18 to the defrosting heater 20 through the current-supply switch 21. Because of the current supply to the defrosting heater 20, heat is generated from the defrosting heater 20. The current flowing through the defrosting heater 20 is detected by the current detecting circuit 22. The current detecting circuit 22 detects current $I_T$ flowing through the defrosting heater 20 at time T and current $I_{(T+\Delta T)}$ flowing through the defrosting heater 20 at time $(T+\Delta T)$, and its output signals indicative of the heater currents $I_T$ and $I_{(T+\Delta T)}$ are applied to the arithmetic processing circuit 23. The arithmetic processing circuit 23 stores the input signals and calculates the difference $[I_T - I_{(T+\Delta T)}]$ between the heater currents $I_T$ and $I_{(T+\Delta T)}$ or the gradient of decrease $[I_T - I_{(T+\Delta T)}]/\Delta T$ of the heater current $I_T$. For example, when the gradient of heater current decrease $[I_T - I_{(T+\Delta T)}]$ decreases to a value smaller than a predetermined setting a and then increases to attain another setting b larger than the value a, the arithmetic processing circuit 23 generates its output signal and applies this output signal to the control circuit 24. More precisely, the arithmetic processing circuit 23 detects that the heater current $I_T$ has attained the level indicated by the point A in FIG. 4 by finding the fact that the gradient of heater current decrease $[I_T - I_{(T+\Delta T)}]/\Delta T$ has become smaller than the value a. Then, when the gradient of heater current decrease $[I_T - I_{(T+\Delta T)}]/\Delta T$ increases again and attains the value b after the heater current $I_T$ has been maintained at a substantially constant level, the arithmetic processing circuit 23 finds that the heater current $I_T$ has attained the level of the point B shown in FIG. 4 and generates its output signal. In response to the application of the output signal from the arithmetic processing circuit 23 to the control circuit 24, the control circuit 24 turns off the current-supply switch 21. When the current-supply switch 21 is thus turned off, the current supply to the defrosting heater 20 is ceased to complete the removal of frost. The gradient of decrease of the heater current $I_T$ will be equal to the value a in the vicinity of a point C shown in FIG. 4 and will be equal to the value b in the vicinity of another point D shown in FIG. 4. However, the current-supply switch 21 would not be turned off although the gradient of decrease of the heater current $I_T$ will become equal to the value b in the vicinity of the point D, by so arranging that the current detecting circuit 22 detects the heater current $I_T$ and applies its output signal indicative of the detected heater current $I_T$ to the arithmetic processing circuit 23 after a predetermined period of time has elapsed subsequent to the turning-on of the current-supply switch 21. It will thus be seen that, in the defrosting apparatus according to the present invention, a change in the current flowing through the defrosting heater 20 is detected, and, upon detection of the completion of frost removal, the current being supplied to the defrosting heater 20 is cut off to end the defrosting operation.

Figure 6:
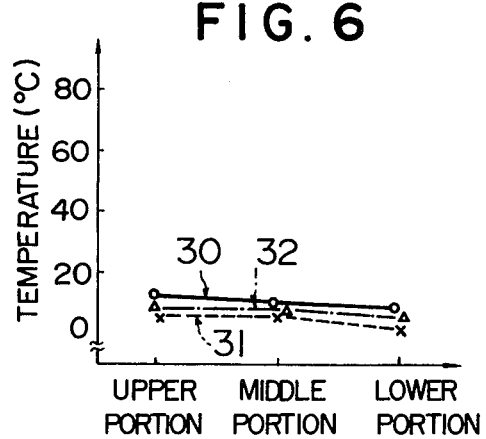
FIG. 6 is a graph showing the distribution of temperature at various portions of the evaporator defrosted by the defrosting heater employed in the defrosting apparatus of the present invention.
Figure 7:
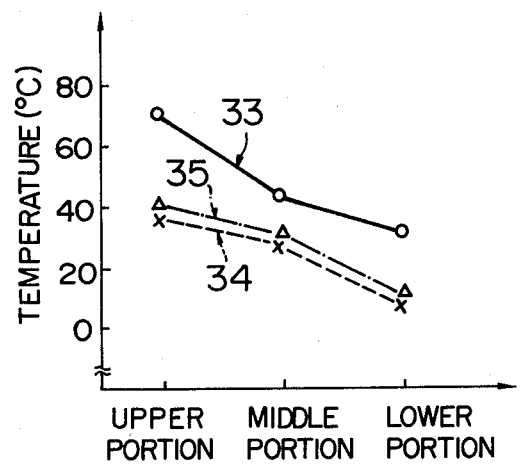
FIG. 7 is a graph showing the distribution of temperature at various portions of the cooler defrosted by a prior art defrosting heater.

It will be understood from the above description that, by the employment of the defrosting heater 2 possessing the function of self-temperature control, the defrosting heater 2 itself can sense the completion of defrosting operation without the necessity for provision of a separate element for sensing the completion of defrosting operation. FIG. 6 shows the distribution of temperature at various portions of the cooler 1 at the time of complete frost removal when the operating temperature setting of the defrosting heater 2 possessing the function of self-temperature control is selected to be 65° C., and such a heater 2 is used for removing frost from the cooler 1 of the refrigerator shown in FIG. 1. In FIG. 6, the solid curve 30 represents the temperature of the defrosting heater 2 possessing the function of self-temperature control, the dashed line curve 31 represents the temperature of the refrigerant conduit 1a, and the one-dot chain curve 32 represents the surface temperature of the heat exchanging fins 3. FIG. 7 shows the distribution of temperature at various portions of the cooler 1 when a prior art defrosting heater is employed. In FIG. 7, the solid curve 33 represents the temperature of the prior art defrosting heater, the dashed line curve 34 represents the temperature of the refrigerant conduit 1a, and the one-dot chain curve 35 represents the surface temperature of the heat exchanging fins 3. It will be apparent from comparison between FIGS. 6 and 7 that, by the use of the defrosting heater according to the present invention, the temperature at various portions of the evaporator can be uniformly distributed, and there are no cooler portions having unnecessarily high temperatures.

The operating temperature setting of the defrosting heater 2 possessing the function of self-temperature control can be changed by suitably selecting the organic material forming the heater element 5 together with carbon. Satisfactory results were obtained when the operating temperature setting of the heater used for removal of frost from the cooler of a refrigerator, an air conditioner or the like was selected to be between 30° C. and 110° C. Table 1 shows the operating temperature setting of the defrosting heater 2 and the results of defrosting by the heater 2.

TABLE 1

Deposited frost: 100 ml

| Operating temperature setting | Defrost duration | Temperature rise of load (ice cream) | Difference between max and min temperature portions of cooler |
|---|---|---|---|
| 20° C. | 26 min | 7° C. | 5° C. |
| 30° C. | 24 min | 6° C. | 6° C. |
| 65° C. | 17 min | 3° C. | 9° C. |
| 110° C. | 15 min | 6° C. | 19° C. |
| 120° C. | 15 min | 8° C. | 27° C. |

Table 1 illustrates an example in which the freezer load was ice cream. Ice cream starts to melt at −12° C. In a refrigerator in which the controlled temperature of its freezer compartment is set at −18° C., ice cream can be stored for a relatively long period of time when the temperature rise of ice cream is not more than 6° C. The use of a defrosting heater, whose operating temperature setting is not higher than 30° C., is undesirable in that the length of time required for complete defrosting is extended, and the temperature of a foodstuff stored in the freezer compartment rises inevitably. The use of a defrosting heater, whose operating temperature setting is higher than 110° C., is also undesirable in that the temperature distribution is non-uniform, and any appreciable improvement is not expected as when the prior art defrosting heater is employed.

Another embodiment or a modification of the first embodiment of the present invention utilizes the fact that there is a distinct relation between the points A and B in FIG. 4. More precisely, it has been found that the ratio between the heater current at the point A in FIG. 4 and that at the point B is substantially constant. For example, when the amount of deposited frost is 300 ml, the heater currents $i_A$ and $i_B$ at the points A and B are $i_A = 1.3$ A and $i_B = 1.1$ A, and there holds the relation $i_B \approx 0.85\, i_A$ therebetween. There is also a substantially constant relation between the length of time $t_A$ required for the heater current to attain the level of the point A after the current is supplied and that $t_B$ required for the heater current to attain the level of the point B at which the defrosting operation is completed. Suppose, similarly, that the amount of deposited frost is 300 ml. Then, $t_A = 20$ minutes and $t_B = 28$ minutes and 20 seconds. This gives the relation $t_B \approx 1.4 \times t_A$. In this connection, it is to be noted that, when the temperature of the cooler 1 exceeds 0° C., and the frost remaining on the walls of the cooler is completely molten by heating with the defrosting heater 2, the current value at that time is based to determine the point B.

In this modification of the present invention, the current detecting circuit 22 in FIG. 5 detects the value of current flowing through the defrosting heater 20 at time intervals of $\Delta T$ which is suitably selected, and applies its output signals indicative of the detected current values to the arithmetic processing circuit 23. Suppose that signals $I_T$, $I_{(T+\Delta T)}$ and $I_{(T+2\Delta T)}$ are indicative of the heater current values detected at times T, $(T+\Delta T)$ and $(T+2\Delta T)$ respectively. In response to the serial application of these signals $I_T$, $I_{(T+\Delta T)}$ and $I_{(T+2\Delta T)}$ the arithmetic processing circuit 23 stores those signals and calculates the difference $[I_T - I_{(T+\Delta T)}]$ between the signals $I_T$ and $I_{(T+\Delta T)}$ or the gradient of heater current decrease $[I_T - I_{(T+\Delta T)}]/\Delta T$. The arithmetic processing circuit 23 calculates similarly the difference $[I_{(T+\Delta T)} - I_{(T+2\Delta T)}]$ between the signals $I_{(T+\Delta T)}$ and $I_{(T+2\Delta T)}$ or the gradient of heater current decrease $[(I_{(T+\Delta T)} - I_{(T+2\Delta T)}]/\Delta T$. Then, the arithmetic processing circuit 23 calculates the difference between the results of calculation. Thus, for example, the difference $[I_T - I_{(T+\Delta T)}] - [I_{(T+\Delta T)} - I_{(T+2\Delta T)}] = I''$ is first calculated. This value $I''$ indicates the tendency of increase or decrease of the value of current flowing through the defrosting heater 20, and the point A in FIG. 4 indicates that the value of $I''$ changes from positive to negative at that point. Then, the arithmetic processing circuit 23 multiplies the signal, corresponding to the value of heater current at the positive-to-negative turning point of $I''$, by a predetermined value and stores the result of multiplication. Then, the arithmetic processing circuit 23 compares the stored data with the signal corresponding to the detected heater current and finds that the point B in FIG. 4 is reached when the latter value coincides with the former value. The resultant output signal from the arithmetic processing circuit 23 is applied to the control circuit 24.

In another modification of the first embodiment of the present invention, the arithmetic processing circuit 23 calculates the difference between the output signals of the current detecting circuit 22 at times T and $(T+\Delta T)$ and also the difference between those at times $(T+\Delta T)$ and $(T+2\Delta T)$. Then, the circuit 23 subtracts the latter value from the former to find the point at which the result of subtraction changes from positive to negative. Suppose that the time $(T+\Delta T)$ is the positive-to-negative turning point, then, the circuit 23 stores that data as a reference signal indicative of the point A in FIG. 4.

Subsequently, the arithmetic processing circuit 23 multiplies the reference signal indicative of the time $(T+\Delta T)$ by a predetermined value, and, on the basis of the result of multiplication, calculates the estimated duration of current supply to the defrosting heater 20 after the time $(T+\Delta T)$. Upon lapse of the calculated estimated duration of current supply, the arithmetic processing circuit 23 applies its output signal to the control circuit 24. Later operation is the same as that described hereinbefore.

Still another modification of the first embodiment of the present invention will now be described. As described already, the defrosting operation is completed at the point B in FIG. 4. When the defrosting heater 20 continues to generate heat thereafter, the temperature of the defrosting heater 20 rises progressively until all the portions of the cooler 1 are placed in the state of thermal equilibrium, since the frost deposited on the cooler 1 has been entirely molten. Therefore, the rate of change of current flowing through the defrosting heater 20 after the defrosting completion point B in FIG. 4 shows a decreasing tendency. Thus, the rate of change of current flowing through the defrosting heater 20 charges from its increasing tendency to its decreasing tendency at the defrosting completion point B in FIG.

4. This phenomenon is utilized in this modification of the present invention.

As in the first modification of the present invention, the arithmetic processing circuit 23 stores the output signals $I_T$, $I_{(T+\Delta T)}$ and $I_{(T+2\Delta T)}$ from the current detecting circuit 22 and generates a reference signal by calculating the difference $[I_T-I_{(T+\Delta T)}]-[I_{(T+\Delta T)}-I_{(T+2\Delta T)}]$ or the difference $[I_T-I_{(T+\Delta T)}]/\Delta T-[I_{(T+\Delta T)}-I_{(T+2\Delta T)}]/\Delta T$. When, for example, the former difference is given by $I''$ as the reference signal, the value of $I''$ indicates the tendency of increase or decrease of current flowing through the defrosting heater 20. Therefore, the point at which the value of $I''$ changes from negative to positive corresponds to the point B in FIG. 4, that is, the point at which the current change rate turns from its increasing tendency to its decreasing tendency. As soon as this signal $I''$ turns from negative to positive, the arithmetic processing circuit 23 applies its output signal to the control circuit 24. In response to the application of the output signal from the arithmetic processing circuit 23, the control circuit 24 turns off the current-supply switch 21. As soon as the switch 21 is turned off, the current supply to the defrosting heater 20 is ceased to complete the defrosting operation. Although the rate of change of current flowing through the defrosting heater 20 turns from its increasing tendency to its decreasing tendency in the vicinity of the point C in FIG. 4, the current-supply switch 21 would not be turned off in the vicinity of the point C, by so arranging that the current detecting circuit 22 detects the heater current or the arithmetic processing circuit 23 executes the calculation after a predetermined period of time has elapsed subsequent to the turning-on of the switch 21.

A second embodiment of the present invention will be described with reference to FIGS. 8 and 9. The inventors have found that, although the duration of current supply to the defrosting heater 2 differs depending on the amount of frost deposited on the cooler 1, there is a substantially constant relation or ratio between the value of the inrush current indicated by the point C in FIG. 4 and the value of the heater current at the defrosting completion point B. For example, the value of the inrush current $i_{max}$ at the point C is $i_{max}=3.7$ A, and the value of the heater current $i_F$ at the defrosting completion point B in FIG. 4 is $i_F=1.1$ A. Thus, there is the relation $i_F\approx 0.3\times i_{max}$. This fact is utilized in this second embodiment of the present invention.

Figure 8:
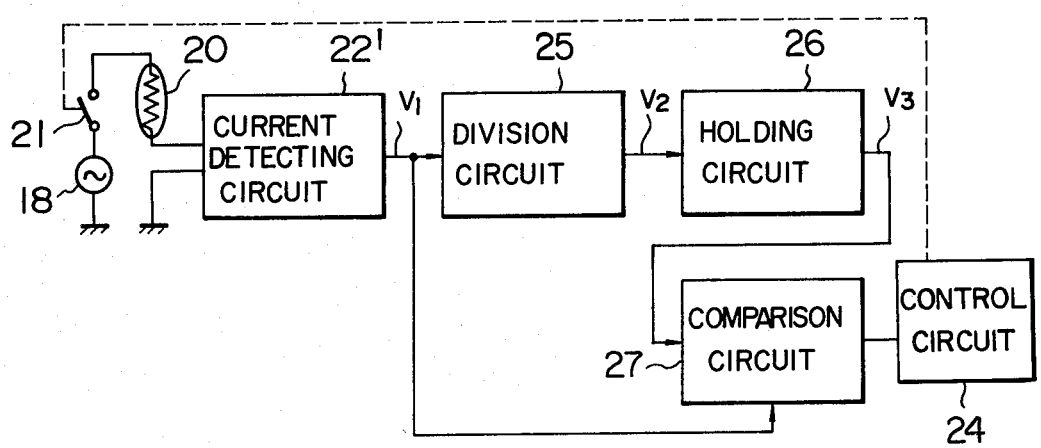
FIG. 8 is a block diagram of another embodiment of the defrosting apparatus according to the present invention.

Referring to a block diagram of FIG. 8 showing the structure of the second embodiment of the defrosting apparatus according to the present invention, a division circuit 25 connected to a current detecting circuit 22' for dividing the output voltage $v_1$ (FIG. 9) of the current detecting circuit 22' by a suitably selected factor. A holding circuit 26 holds the maximum value $v_3$ of the output voltage $v_2$ of the division circuit 25. A comparison circuit 27 compares the output voltage $v_1$ of the current detecting circuit 22' with the voltage $v_3$ held in the holding circuit 26 and generates its output signal turning off the current-supply switch 21 via a control circuit 24 when the relation $v_1\leq v_3$ holds between the voltages $v_1$ and $v_3$. The division circuit 25, holding circuit 26 and comparison circuit 27 form the arithmetic processing circuit 23 of FIG. 5.

Figure 9:
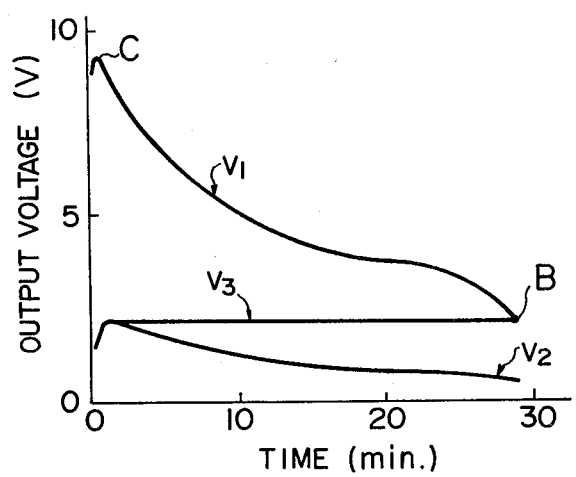
FIG. 9 is a graph showing how output voltages of various parts of the defrosting apparatus shown in FIG. 8 vary with time.

The current detecting circuit 22', which may be a current transformer, transforms the current flowing through the defrosting heater 20 into a voltage as shown by the curve $v_1$ in FIG. 9, and its output voltage $v_1$ is supplied to both of the division circuit 25 and the comparison circuit 27. The division circuit 25 divides the output voltage $v_1$ of the current detecting circuit 22' by a suitably selected factor by means of, for example, voltage dividing resistors. The divided output voltage $v_2$ of the division circuit 25 is held in the holding circuit 26. The holding circuit 26 is composed of a capacitor and a diode in its simplest form and holds the maximum value $v_3$ of the output voltage $v_2$ of the division circuit 25 to supply this maximum voltage $v_3$ to the comparison circuit 27. The comparison circuit 27, which is, for example, an arithmetic circuit, compares the output voltage $v_1$ of the current detecting circuit 22' with the output voltage $v_3$ of the holding circuit 26 and applies a turn-off signal via the control circuit 24 to the current-supply switch 21 when the result of comparison proves that the output voltage $v_1$ of the current detecting circuit 22' is equal to or lower than the output voltage $v_3$ of the holding circuit 26.

Although the maximum value of the output voltage of the division circuit 25 is held in the holding circuit 26 in this second embodiment, it is apparent that the effect is substantially the same when the holding circuit 26 holds, instead of the maximum value $v_3$, a voltage which does not correspond to the inrush current supplied to the defrosting heater 20, but a voltage which corresponds to a current value close more or less to the inrush current value. In such a case, the division ratio of the division circuit 25 is suitably changed.

A third embodiment of the present invention will now be described.

The duration of current supply to the defrosting heater 2 differs depending on the amount of frost deposited on the cooler 1. However, the amount of decrease of the heater current between the points A and B in FIG. 4 is determined by a thermal time constant which is a function of the degree of melting of frost and the thermal capacity of the defrosting heater 2. Thus, the amount of decrease of the heater current between the points A and B is substantially constant. This phenomenon is utilized for detecting the completion of frost removal in the third embodiment of the defrosting apparatus according to the present invention.

Figure 10:
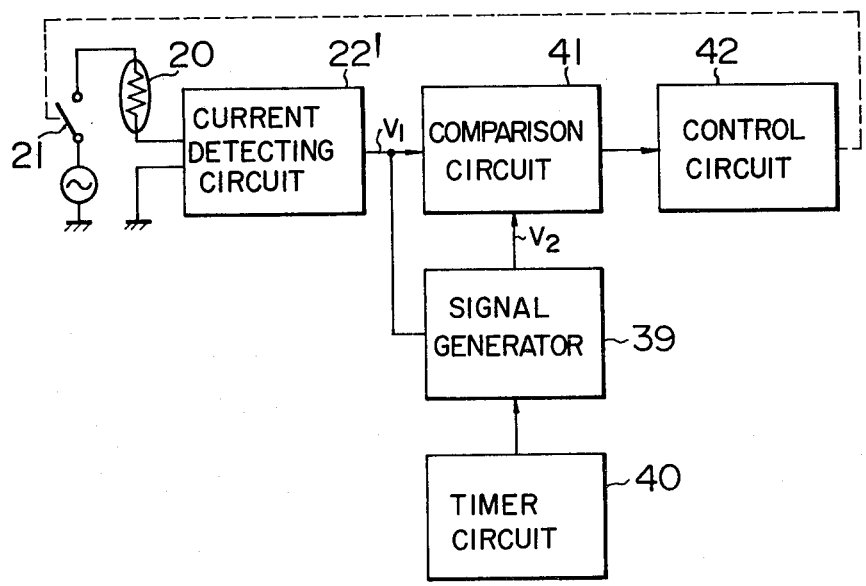
FIG. 10 is a block diagram of still another embodiment of the defosting apparatus according to the present invention.
Figure 11:
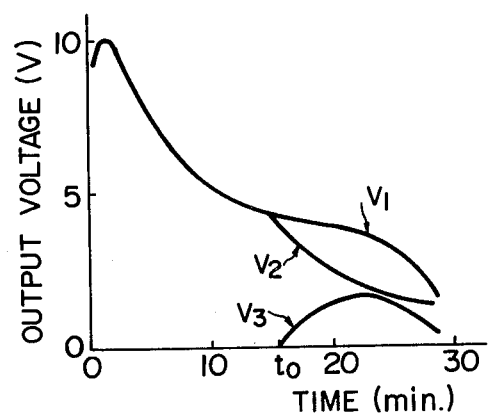
FIG. 11 is a graph showing how output voltages of various parts of the defrosting apparatus shown in FIG. 10 vary with time.

FIG. 10 is a block diagram of the third embodiment of the defrosting apparatus according to the present invention, and FIG. 11 shows waveforms of voltage output signals appearing from various portions of the apparatus.

Referring to FIG. 10, a current detecting circuit 22' detects the current flowing through the defrosting heater 20, and its output voltage $v_1$ is applied to a signal generator 39 and to a comparison circuit 41. The signal generator 39 generates a voltage output signal $v_2$ which decreases with time according to a predetermined function. A timer circuit 40 controls the starting timing of appearance of the voltage output signal $v_2$ from the signal generator 39. The comparison circuit 41 subtracts the output voltage $v_1$ of the current detecting circuit 22' from the output voltage $v_2$ of the signal generator 39 and generates its output signal when the results of subtraction attains a predetermined value. In response to the application of the output signal from the comparison circuit 41, a control circuit 42 turns off the switch 21 through which the current is supplied to the defrosting heater 20 from the power source 18. The signal generator 39, timer circuit 40 and comparison circuit 41 form the arithmetic processing circuit 23 of FIG 5.

The current detecting circuit 22', which may be a current transformer, transforms the heater current into a voltage as shown by the curve $v_1$ in FIG. 11 and supplies this voltage $v_1$ to the comparison circuit 41 and to the signal generator 39. Under control of the timer circuit 40, the signal generator 39 starts to generate a voltage signal as shown by the curve $v_2$ in FIG. 11 from a predetermined time $t_o$. The initial value of the voltage signal $v_2$ is determined by the output voltage $v_1$ of the current detecting circuit 22' appearing at the time $t_o$. The output voltage $v_2$ of the signal generator 39 at the time of completion of defrosting operation is lower than that $v_1$ of the current detecting circuit 22'. In the comparison circuit 41 to which the output voltage $v_1$ of the current detecting circuit 22' and that $v_2$ of the signal generator 39 are applied, the voltage shown by the curve $v_2$ is subtracted from the voltage shown by the curve $v_1$ to provide the resultant voltage as shown by the curve $v_3$. The maximum value $v_{3max}$ of the result of subtraction is stored in the comparison circuit 41. The voltage $v_3$ is compared with the stored maximum voltage $v_{3max}$, and, at the time at which the ratio therebetween attains a predetermined value, the comparison circuit 41 applies a defrosting operation completion signal to the control circuit 42. In response to the application of the defrosting operation completion signal to the control circuit 42 from the comparison circuit 41, the control circuit 42 turns off the current-supply switch 21.

The voltage signal shown by the curve $v_2$ in FIG. 11 utilizes the discharge characteristic of the signal generator 39 when the signal generator 39 is composed of the combination of a capacitor and a resistor. The initial value of the output voltage signal $v_2$ of the signal generator 39 is represented by the output voltage $v_1$ of the current detecting circuit 22' generated at the predetermined time $t_o$ under control of the timer circuit 40. The voltage signal $v_2$ may be such that its final level is lower than the output voltage $v_1$ of the current detecting circuit 22' at the time of completion of defrosting operation, and the locus of the voltage signal $v_2$ depicts a curve of downward convex configuration beneath the straight line connecting between its initial level and its final level.

The relation between the voltage $v_3$ obtained by the subtraction of $v_2$ from $v_1$ and the maximum value $v_{3max}$ thereof is determined on the basis of the factors including the heat generating characteristic of the defrosting heater 20 and the shape of the cooler 1. Further, instead of detecting the ratio between $v_3$ and $v_{3max}$, the time at which $v_3$ decreases by a predetermined level from $v_{3max}$ may be detected to determine the time of completion of the defrosting operation.

It will be understood that the present invention employs a unique defrosting heater 2 whose operating temperature setting is selected to be 65° C. and which has the function of self-temperature control. By virtue of employment of such a heater in the various embodiments of the defrosting apparatus according to the present invention, the temperature at various portions of the cooler 1 can be distributed in a manner as shown in FIG. 6, and, therefore, an unnecessarily high temperature rise at various portions of the cooler can be prevented at the time of completion of the defrosting operation. Consequently, power consumed wastefully by the defrosting heater 2 can be reduced, and the power consumed during the following refrigerating process can be greatly reduced.

On the basis of the teaching above described, those skilled in the art will be readily able to construct the defrosting apparatus of the present invention by specific circuits or to incorporate a microcomputer therein.

Because of the fact that the present invention is based upon effective utilization of the rate of change of the heater current for the detection of completion of the defrosting operation, without relying upon the absolute value of the heater current, any variation in the resistance characteristic of the defrosting heater does not pose any practical problem. Therefore, the defrosting heater can be manufactured with a considerably wide range of tolerance in its resistance value so that the manufacturing cost can be greatly reduced. Further, the circuit adjustment in individual defrosting apparatus can be simplified to improve the productivity of the defrosting apparatus. Furthermore, an uncertain variation of the resistance of the defrosting heater due to a long period time of use does not also pose any practical problem, and, thus, the reliability of the defrosting apparatus can also be improved.

Figure 12:
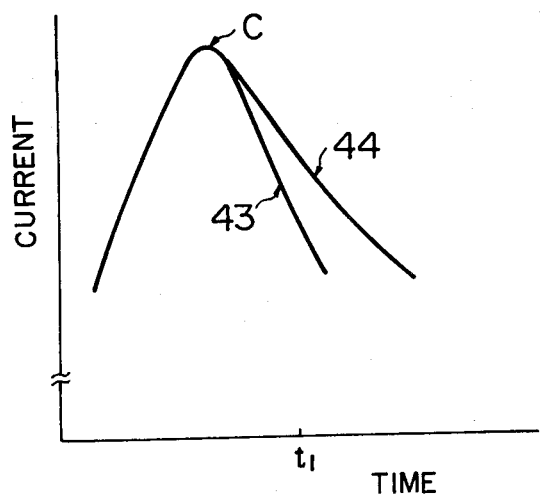
FIG. 12 is a graph showing how the heater current of the defrosting heater decreases with time from the peak of the inruch current.
Figure 13:
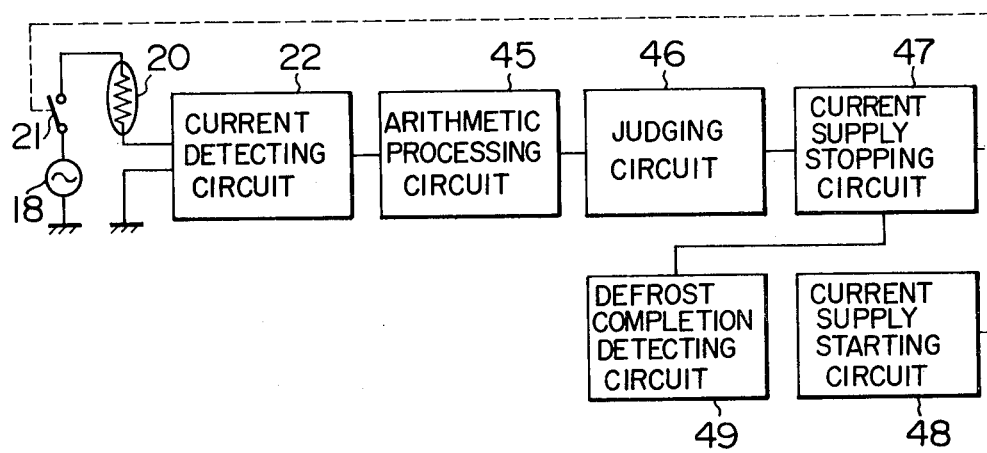
FIG. 13 is a block diagram of yet another embodiment of the defrosting apparatus according to the present invention.

Still another embodiment of the defrosting apparatus according to the present invention will be described with reference to FIGS. 12 to 15. As described already, an inrush current (as shown by the point C in FIG. 4) is supplied to the defrosting heater 20 immediately after the current-supply switch 21 is turned on, and, then, the heater current decreases. The gradient of decrease of the heater current from the point C is proportional to the reciprocal of the amount of frost deposited on the cooler 1. In other words, the time constant of the heater current is small when the amount of deposited frost is small, and is large when the amount of deposited frost is large. The curves 43 and 44 in FIG. 12 represent the gradient of decrease of the heater current when the amount of deposited frost is small and large respectively. In the fourth embodiment of the present invention, the gradient of decrease of the heater current at a predetermined time $t_1$ after the turning-on of the switch 21 connected between the power source 18 and the defrosting heater 20 is detected so as to estimate the amount of deposited frost on the basis of the detected gradient. The defrosting operation is started when the value of the detected gradient is smaller than a predetermined setting. In other words, in the fourth embodiment of the present invention, judgment is made at predetermined time intervals as to whether or not frost removal is required, and the defrosting operation takes place only when the result of judgment proves that frost removal is required. In FIG. 13, the same reference numerals are used to designate the same parts appearing in FIG. 5.

Referring now to FIG. 13, the current detecting circuit 22 detects the current flowing through the defrosting heater 20, and an arithmetic processing circuit 45 is programmed for the arithmetic processing of the output signal from the current detecting circuit 22. A judging circuit 46 judges as to whether or not frost removal is required on the basis of the output signal from the arithmetic processing circuit 45, and a current supply stopping circuit 47 turns off the current-supply switch 21 through which the current is supplied from the power source 18 to the defrosting heater 20. A current supply starting circuit 48 turns on the current-supply switch 21 at predetermined time intervals of, for example, 8 hours in order that the judging circuit 46 can judge as to whether or not frost removal is required. A defrosting completion detecting circuit 49 detects the completion of the defrosting operation of the defrosting heater 20.

Figure 14:
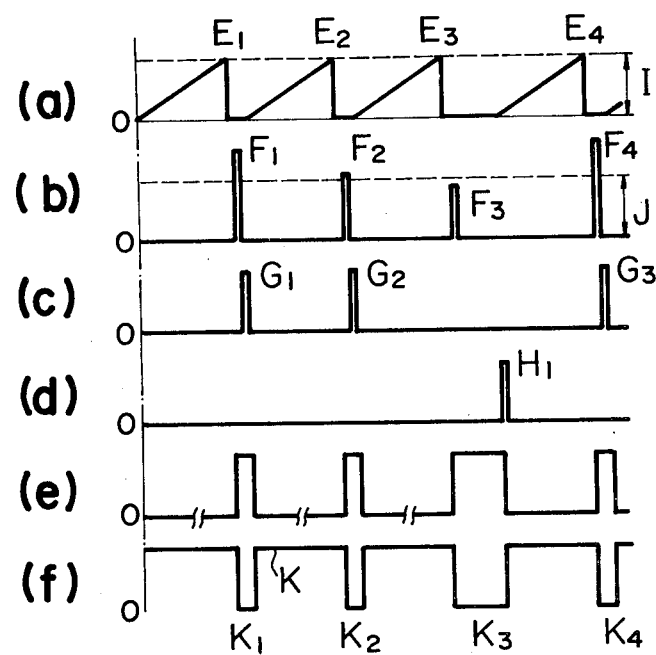
FIG. 14 shows signal waveforms appearing at various parts of the defrosting apparatus shown in FIG. 13.

FIG. 14 shows in (a) the waveform of an integration signal E which is indicative of the duration of operation of the cooler. The current supply starting circuit 48 turns on the switch 21 when the signal E indicative of the duration of operation of the cooler attains a reference level I as shown by points $E_1$, $E_2$, $E_3$ and $E_4$. In this embodiment of the present invention, I is selected to be I=8 hours. FIG. 14 shows in (b) the waveform of the output signal F from the arithmetic processing circuit 45. This signal F is indicative of the result of arithmetic processing on the signal applied from the current detecting circuit 22. FIG. 14 shows in (c) the waveform of the output signal G applied from the judging circuit 46 to the current supply stopping circuit 47 to determine whether or not the current supply to the defrosting heater 20 is to be stopped. This signal G appears as a result of comparison of the level of the output signal F of the arithmetic processing circuit 45 with a predetermined reference level J in the judging circuit 46. The level of the pulse of the signal F is proportional to the gradient of decrease of the heater current at time $t_1$ in FIG. 12. The predetermined reference pulse level J indicates the gradient of decrease of the heater current when a predetermined amount of frost deposits on the cooler. Whenever the level of the signal F is higher than the level J, the judging circuit 46 judges that the amount of deposited frost is less than the predetermined one, and the signal G as shown by $G_1$, $G_2$ and $G_3$ appears from the judging circuit 46 to be applied to the current supply stopping circuit 47. On the contrary, the signal G does not appear from the judging circuit 46 when the amount of deposited frost is large, that is, when the relation $F_3 < J$ holds as shown. FIG. 14 shows in (d) the waveform of the defrosting completion signal H generated from the defrosting completion detecting circuit 49. FIG. 14 shows in (e) the signal waveform indicative of the operation period of the current-supply switch 21, hence, the defrosting heater 20. FIG. 14 shows in (f) the waveform of the signal K indicative of the operation period of the cooler.

Each time the level of the integration signal $E_1$, $E_2$, $E_3$ or $E_4$ indicative of the duration of operation of the cooler attains the predetermined reference level I, the current supply starting circuit 48 acts to turn on the current-supply switch 21, and, immediately thereafter, the integration signal $E_1$, $E_2$, $E_3$ or $E_4$ indicative of the duration of operation of the cooler is restored to its zero level. The integration of the operation of the cooler is then started again. A cooler control function (not shown) is separately provided so that the cooler ceases its refrigerating operation during the operating period of the defrosting heater 20 and performs its refrigerating operation during the non-operating period of the defrosting heater 20. It will be seen in FIG. 14 that the cooler ceases its refrigerating operation as shown by the period $K_1$ when the signal $E_1$ attains the level I.

When the current-supply switch 21 is turned on, current is supplied from the power source 18 to the defrosting heater 20 through the switch 21. The current flowing through the defrosting heater 20 is supplied to the current detecting circuit 22. The current detecting circuit 22 which may be a current transformer produces a signal corresponding to the heater current and applies such a signal to the arithmetic processing circuit 45. The arithmetic processing circuit 45 detects the maximum level of the signal and calculates the rate of change of the signal between the point of attainment of the maximum level and the point $t_1$ which is later by the predetermined period of time than the former point. The signal $F_1$ indicative of the result of calculation is applied to the judging circuit 46 from the arithmetic processing circuit 45. When the level of the signal $F_1$ applied to the judging circuit 46 is higher than the predetermined reference level J, the current supply stopping signal $G_1$ is applied from the judging circuit 46 to the current supply stopping circuit 47 so as to stop the current supply to the defrosting heater 20. In response to the application of the signal $G_1$, the current supply stopping circuit 47 turns off the current-supply switch 21, and the defrosting heater 20 ceases generation of heat. As soon as the switch 21 is turned off, the cooler starts its refrigerating operation as shown by the signal K in FIG. 14 under control of the separately provided, cooler control fuction. The current supply starting circuit 48 starts to count the duration of operation of the cooler, and, when the integration signal $E_2$ attains the predetermined reference level I shown in FIG. 14, the switch 21 is turned on again to permit operation of the various elements of the defrosting apparatus in a manner as described hereinbefore.

On the other hand, when the level of the signal $F_3$ applied to the judging circuit 46 is lower than the predetermined reference level J as seen in FIG. 14, the current supply stopping signal G is not applied from the judging circuit 46 to the current supply stopping circuit 47. Since the current supply stopping signal G is not applied, the current supply stopping circuit 47 does not turn off the switch 21 which is, therefore, maintained in the on-position. Since the switch 21 is maintained turned on, current is continuously supplied to the defrosting heater 20, and the frost deposited on the cooler is melted by the heat continuously generated from the defrosting heater 20. Upon complete removal of the deposited frost, the defrosting completion signal $H_1$ is applied to the current supply stopping circuit 47 from the defrosting completion detecting circuit 49. In response to the application of the signal $H_1$, the current supply stopping circuit 47 turns off the switch 21. As soon as the switch 21 is turned off, the cooler starts its refrigerating operation under control of the cooler control function (not shown).

Figure 15:
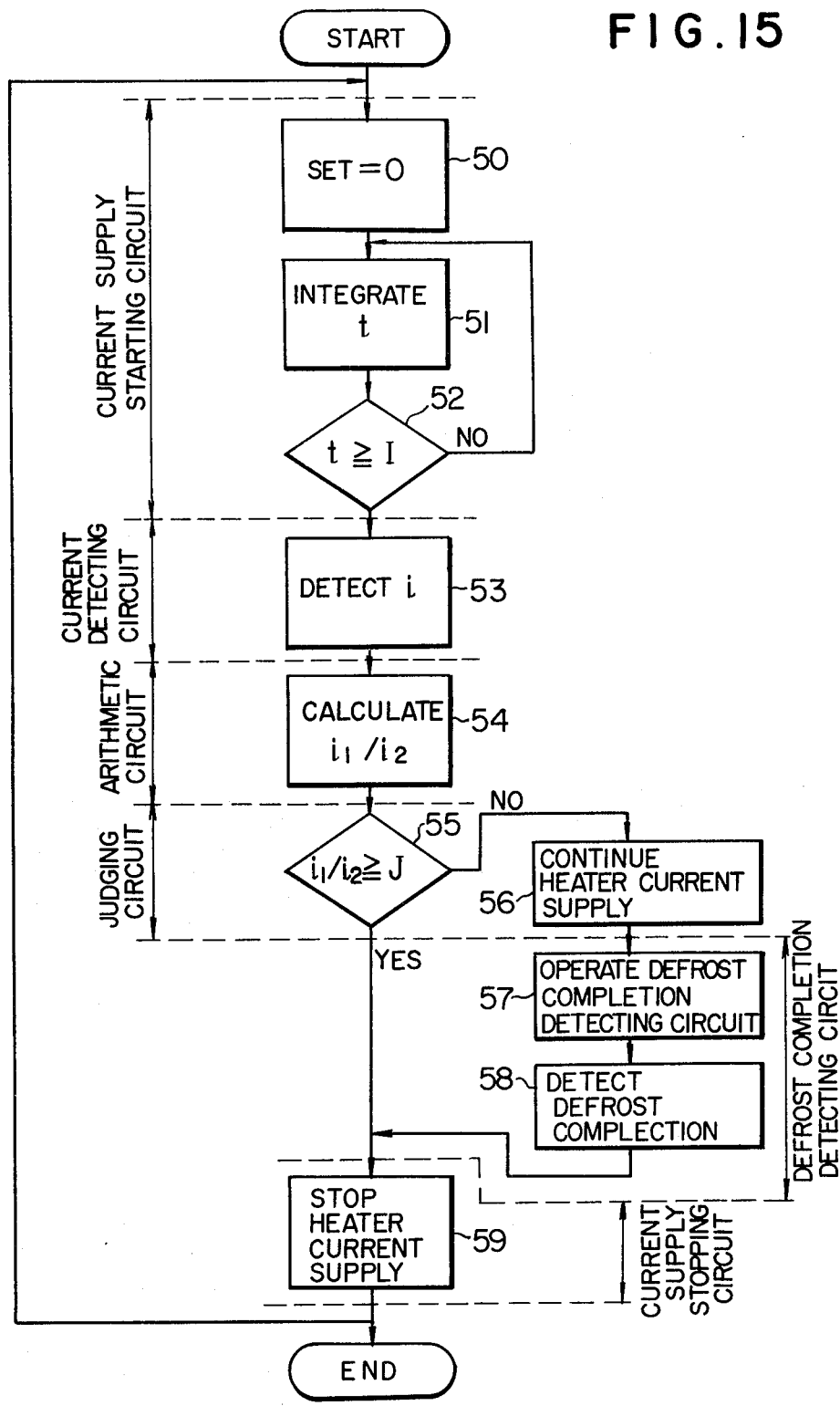
FIG. 15 is a flow chart for illustrating the operation of the defrosting apparatus shown in FIG. 13.

FIG. 15 is a flow chart of operation of the defrosting apparatus shown in FIG. 13 when it is controlled by a microcomputer. In step 50, the counter counting operation period t of the cooler is set at t=0 in the current supply starting circuit 48, and, in step 51, the counter starts integration of the operation period t. In step 52, the time $t_1$ is detected at which the relation $t \geq I$ holds. In step 53, the current detecting circuit 22 detects the heater current i at the time $t_1$ at which the relation $t \geq I$ holds. In step 54, the arithmetic processing circuit 45 calculates the ratio $i_1/i_2$ between the heater current $i_1$ at the time $t_1$ and the heater current $i_2$ at the time $(t_1 + \Delta t)$. In step 55, the judging circuit 46 judges as to whether the relation $i_1/i_2 \geq J$ holds. When the results of judgement is "Yes", the current supply stopping signal G for stopping the current supply to the defrosting heater 20 is generated from the judging circuit 46. When, on the other hand, the result of judgement is "No", the signal G is not generated from the judging circuit 46, and the current supply to the defrosting heater 20 is continued in step 56. Since the heater current is now continuously supplied to the defrosting heater 20, the defrosting completion detecting circuit 49 operates in step 57 and finally generates the defrosting completion signal H in step 58 upon detection of completion of the defrosting operation. In step 59, the current supply stopping circuit 47 turns off the switch 21 to stop the current supply to the defrosting heater 20 in response to the output signal from the judging circuit 46 or the defrosting completion detecting circuit 49.

The completion of the defrosting operation in the defrosting apparatus shown in FIG. 13 may be detected by a thermostat which detects the surface temperature of the cooler, or it may be simply detected by a timer. When the timer is used for the detection of completion of the defrosting operation, the timer setting may be selected to correspond to the reciprocal of the level of the output signal F from the arithmetic processing circuit 45. Furthermore, a circuit arrangement as shown in FIG. 5, 8 or 10 may be used for detecting that the value of current flowing through the defrosting heater 20 has decreased to a level lower than a predetermined threshold level.

Further, although the operation of the evaporator in the fourth embodiment of the present invention is illustrated to include only the energized mode and the deenergized mode, it is apparent that the energized mode includes the temporal pause mode since the temperature control is naturally carried out even in the energized mode. Furthermore, the cooler placed in the energized mode may not necessarily immediately start its refrigerating operation, but the cooler may start its refrigerating operation after the cooler heated by the defrosting heater is allowed to cool down. The present invention is also applicable to such a case without giving rise to any practical problem.

It will be understood from the above description of the fourth embodiment of the present invention that the defrosting operation is carried out only when frost is deposited in a large amount which will reduce the refrigerating ability of the cooler. Therefore, the optimum control of the defrosting procedure can be attained without making an unnecessary defrosting operation, and the great effect of power saving can be exhibited.

In the fourth embodiment of the present invention, the duration of operation of the cooler after the deenergization of the defrosting heater and before the energization of the defrosting heater is preferably suitably adjusted to satisfy the refrigeration requirement in the summer season in which the amount of deposited frost is largest, as has been commonly done in the prior art. When the duration is so adjusted, the number of defrosting steps, hence, the number of cooler heating steps can be reduced in the winter season in which the amount of deposited frost is smallest and the necessity for frost removal is considerably less than that in the summer season. Therefore, power required for re-cooling the cooler can be reduced to attain the corresponding effect of power saving.

In the aforementioned various embodiments of the present invention, the current flowing through the defrosting heater has been detected for the purpose of control. However, the effect is the same when the power supplied to the defrosting heater is detected.

Although a heater 2 including a heater element composed of a mixture of carbon and an organic material is employed in the aforementioned embodiments of the present invention, it is apparent that the heating element of the heater is in no way limited to such a specific composition. In effect, the heater may be any one of those in which the temperature coefficient of resistance is positive, and the resistance value changes sharply at a specific temperature. Therefore, the heater may, for example, be a ceramic heater in the form of a thermistor which is composed of an inorganic material such as barium titanate and exhibits a positive temperature coefficient of resistance. It is needless to mention that such a ceramic heater can be equally effectively used in the present invention. In such a case, it is preferable to select the operating temperature range between 30° C. and 110° C.

Figure 16:
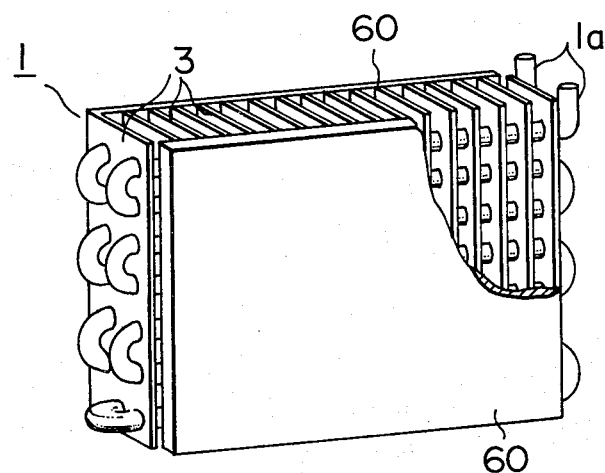
FIG. 16 is a partly cutaway, perspective view of a cooler having a ceramic heater associated therewith.
Figure 17:
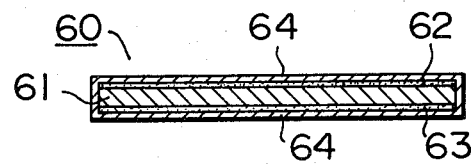
FIG. 17 is a sectional view of the ceramic heater shown in FIG. 16.

FIG. 16 shows the structure of an cooler 1 having such a ceramic heater 60 associated therewith. FIG. 17 is a sectional view of the ceramic heater 60. Referring to FIG. 17, the ceramic heater 60 includes a barium titanate heater element 61, current-supply electrodes 62, 63 and insulating covering layers 64.

Although the current flowing through the defrosting heater 20 is detected for the purpose of control in the aforementioned various emodiments of the present invention, it is needless to mention that detection of the power supplied to the defrosting heater 20 can provide the same effect.

We claim:

1. A defrosting apparatus for removing frost deposited on a cooler comprising:
    a heater exhibiting a positive temperature coefficient of resistance which changes sharply at a specific temperature;
    a current detecting circuit detecting current flowing through said heater and providing an output indicative thereof;
    signal processing means connected to said current detecting circuit for generating a reference signal at one point during the defrost operation based upon the detected heater current and for generating an output signal indicative of a predetermined relation of heater current detected at a later point in the defrost operation to the reference signal; and
    control means for controlling the current supplied to said heater on the basis of the output signal from said signal processing means.

2. A defrosting apparatus as claimed in claim 1, wherein said signal processing means generates its output signal indicative of completion of the defrosting operation when the value of the detected heater current attains a predetermined proportion of that flowing through said heater at a turning point of the heater current change rate from a decreasing tendency to an increasing tendency.

3. A defrosting apparatus as claimed in claim 1, wherein said signal processing means generates its output signal indicative of completion of the defrosting operation when the operation period of said heater after a turning point of the heater current change rate from a decreasing tendency to an increasing tendency attains a predetermined proportion of that required until said turning point is reached after said heater is energized.

4. A defrosting apparatus as claimed in claim 1, wherein said signal processing means generates its output signal indicative of completion of the defrosting operation when the heater current change rate attains a turning point of from an increasing tendency to a decreasing tendency.

5. A defrosting apparatus as claimed in claim 1, wherein said signal processing means includes memory means for storing a predetermined proportion of the value of inrush current supplied to said heater immediately after the energization of said heater as the reference signal and generates its output signal indicative of completion of the defrosting operation when the detected heater current value attains coincidence with said stored value.

6. A defrosting apparatus as claimed in claim 1, wherein said signal processing means includes a signal generator generating an output signal decreasing in level with time and memory means for storing the maximum value of the difference between the output signal of said signal generator and the detected heater current as the reference signal and generates its output signal indicative of completion of the defrosting operation when said stored maximum value and said difference attain a predetermined relation therebetween.

7. A defrosting apparatus as claimed in claim 1, wherein said signal processing means includes arithmetic processing means for generating an output signal indicative of the gradient of decrease of the heater current at a predetermined time after the heater current attains its maximum value and judging means for judging the necessity or non-necessity for the supply of current to said heater on the basis of the output signal of said arithmetic processing means and generates an output signal indicative of starting timing of the defrosting operation proves when the result of judgment that the supply of current to said heater is required.

8. A defrosting apparatus for removing frost deposited on an evaporator comprising:
a heater exhibiting a positive temperature coefficient of resistance which changes sharply at a specific temperature;
current supply starting means for supplying current to said heater at intervals of a predetermined period of time;
current detecting means for detecting current flowing through said heater;
arithmetic processing means for calculating the gradient of decrease of the heat current after the heater current attains its maximum value;
judging means for judging the necessity or non-necessity for the supply of current to said heater on the basis of the calculated gradient of decrease of the heater current;
defrosting completion detecting means for detecting completion of the defrosting operation; and
current supply stopping means for stopping the supply of current to said heater in response to the application of the signal from said judging means or said defrosting completion detecting means.

9. A defrosting apparatus as claimed in claim 1 or 8, wherein said heater includes a heater element composed of a mixture or an electrical conductive material and an organic material and an electrode material for supplying current to said heater element, and its operating temperature range is selected to be between 30° C. and 110° C.

10. A defrosting apparatus as claimed in claim 1 or 8, wherein said heater is a ceramic heater including a heater element of barium titanate composition, and its operating temperature range is selected to be between 30° C. and 110° C.

11. A defrosting apparatus as claimed in claim 1, further comprising current supply starting means for supplying current to said heater at intervals of a predetermined period of time, and defrosting completion detecting means for detecting completion of the defrosting operation, said signal processing means including arithmetic processing means for calculating the gradient of decrease of the heater current after the heater current attains its maximum value, and said control means including judging means for judging the necessity or non-necessity for the supply of current to said heater on the basis of the calculated gradient of decrease of the heater current, and current supply stopping means for stopping the supply of current to said heater in response to the application of the signal from said judging means or said defrosting completion detecting means.

12. A defrosting apparatus as claimed in claim 1, wherein said signal processing means includes arithmetic processing means for generating a defrosting completion signal indicative of completion of a defrosting operation as the output signal when the detected heater current attains a predetermined proportion of the reference signal.

13. A defrosting apparatus as claimed in claim 12, wherein said arithmetic processing means generates the reference signal in accordance with changes of the detected heater current during the defrosting operation.

14. A defrosting apparatus as claimed in claim 13, wherein said arithmetic processing means generates the reference signal in accordance with a time period of the heater operation between the beginning of flowing of the heater current and a turning point at which a rate of change of the detected heater current changes from a decreasing tendency to an increasing tendency, said arithmetic processing means generating the defrosting completion signal at a time period of the heater operation after the turning point when the detected heater current attains a predetermined portion of the reference signal.

15. A defrosting apparatus as claimed in claim 13, wherein said arithmetic processing means generates the defrosting completion signal when the rate of change of the detected heater current changes from an increasing tendency to a decreasing tendency.

16. A defrosting apparatus as claimed in claim 13, wherein said arithmetic processing means generates the reference signal in accordance with the rate of change of the detected heater current changing from a decreasing tendency to an increasing tendency.

17. A defrosting apparatus as claimed in claim 13, wherein said arithmetic processing means generates the reference signal in accordance with the detected heater current reaching a maximum peak value.

18. A defrosting apparatus as claimed in claim 13, wherein said arithmetic processing means includes a signal generator for generating an output signal decreasing in value with lapse of time from a value of the detected heater current at a predetermined time after the start of flowing of the heater current, and comparing means for detecting a difference between values of the output signal of said signal generating means and the detected heater current and for generating the reference signal in accordance therewith.

19. A defrosting apparatus as claimed in claim 13, further comprising switching means connected to said heater for one of enabling and inhibiting a current to flow through said heater in accordance with a position thereof, power supply means connected to said switching means for supplying the heater current at the enabling position of said switching means, and said control means being connected between said arithmetic processing means and said switching means for inhibiting said switching means when said arithmetic processing means provides the defrosting completion signal.

20. A defrosting apparatus as claimed in claim 13, further comprising current supply starting means for supplying current to said heater at intervals of a predetermined period of time, said signal processing means including additional arithmetic processing means for calculating the gradient of decrease of the detected heater current after the heater current attains its maximum value, and said control means including judging means for juding the necessity or non-necessity for the supply of current to said heater on the basis of the calculated gradient of decrease of the detected heater current, and current supply stopping means for stopping the supply of current to said heater in response to the application of the signal from said judging means or said defrosting completion signal from said arithmetic processing means.

21. A defrosting apparatus as claimed in claim 1, wherein said signal processing means generates the reference signal in accordance with changes in the resistance characteristic of said heater due to prolonged use of said heater.

* * * * *